US011334863B2

(12) United States Patent
Morgan et al.

(10) Patent No.: US 11,334,863 B2
(45) Date of Patent: May 17, 2022

(54) METHODS AND DEVICE FOR TOUCHLESS PAYMENT PROCESSING

(71) Applicant: NCR Corporation, Atlanta, GA (US)

(72) Inventors: Kip Oliver Morgan, Atlanta, GA (US); James Emery Fugedy, II, Marietta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/915,100

(22) Filed: Jun. 29, 2020

(65) Prior Publication Data

US 2021/0406859 A1 Dec. 30, 2021

(51) Int. Cl.
*G06Q 20/20* (2012.01)
*G06Q 20/10* (2012.01)
*G06Q 20/02* (2012.01)
*G06Q 20/32* (2012.01)
*G06Q 30/06* (2012.01)
*G06K 19/06* (2006.01)
*G06Q 30/00* (2012.01)
*G08B 7/00* (2006.01)

(52) U.S. Cl.
CPC ..... *G06Q 20/204* (2013.01); *G06K 19/06037* (2013.01); *G06Q 20/02* (2013.01); *G06Q 20/10* (2013.01); *G06Q 20/208* (2013.01); *G06Q 20/209* (2013.01); *G06Q 20/322* (2013.01); *G06Q 20/3276* (2013.01); *G06Q 30/0185* (2013.01); *G06Q 30/0607* (2013.01); *G08B 7/00* (2013.01)

(58) Field of Classification Search
CPC ....... G06Q 20/204; G06Q 50/12; G06Q 20/18
See application file for complete search history.

(56) References Cited

U.S. PATENT DOCUMENTS

| 10,460,303 | B2 * | 10/2019 | Patil ..................... G08B 13/246 |
| 10,699,264 | B1 * | 6/2020 | Barman ................. G06Q 20/24 |
| 11,068,867 | B1 * | 7/2021 | Tucker ................... G06Q 30/04 |
| 2011/0251892 | A1 * | 10/2011 | Laracey ............. G06Q 30/0253 705/14.51 |
| 2013/0085878 | A1 * | 4/2013 | Edwards ............. G07G 1/0054 705/23 |
| 2014/0324606 | A1 * | 10/2014 | Fortuna ................ G06Q 20/322 705/15 |

* cited by examiner

*Primary Examiner* — A. Hunter Wilder
(74) *Attorney, Agent, or Firm* — Schwegman, Lundberg & Woessner

(57) ABSTRACT

A transaction is maintained in a shopping cart and processed by a transaction manager in cooperation with a transaction application of a user device. The status device displays a code that when obtained by user device and provided to the transaction manager links the cart to the status device. Acquisition of the code is an indication that the customer associated with the cart is ready to checkout and pay for the items in the cart. The entire payment processing between the application, the transaction manager, and a payment service is monitored by transaction manager. Payment processing statuses for the payment as it processes in real time are sent from the transaction manager to the status device. Status device displays payment status messages on a display of that device and/or illuminates colored lights and/or plays specialized audible sounds indicative of the statuses as the payment processing continues in real time.

9 Claims, 10 Drawing Sheets

METHODS AND DEVICE FOR TOUCHLESS PAYMENT PROCESSING

BACKGROUND

Most mobile shopping techniques are primarily frictionless (performed by the customers without interacting with a store-provided device or store clerk) until payment is required of the customers. Some techniques may offer self-checkout at a Self-Checkout terminal or a Point-Of-Sale (POS) terminal. However, the payment techniques still require some friction (touching and/or interaction by the customers with clerks or Self-Checkout terminals).

In some cases, payment via a customer's mobile phone is possible but such a technique does not offer confirmation to store employees that the customer actually paid before the customer exits the store. Furthermore, for security reasons most stores prefer that customers finalize and perform payments at a fixed location that can be monitored by store staff.

As a result, achieving true frictionless transactions remain elusive in the industry because with existing self-shopping techniques, security remains a significant concern for the stores.

Moreover, with the advent of global pandemics, such as COVID19, both stores and customers are rightly concerned about the interaction between customers with Self-Checkout terminals (such as, when customers all touch the same touchscreen displays of the Self-Checkout terminals) and stores are concerned with customer and store staff interaction (such as, providing a payment card to the staff, customers standing in close proximity to the staff, customers touching a same payment terminal shared with other customers that checkout, etc.). Stores are looking for solutions that avoid such interaction and touching to improve health and safety for both their customers and their staff.

SUMMARY

In various embodiments, methods and a device for touchless payment processing are presented.

According to an embodiment, a method for touchless payment processing is provided. For example, a touchless payment status device is configured for communicating payment statuses in real time for a transaction of a customer. A code is received from a mobile device operated by the customer; the code obtained by the mobile device from the touchless payment device. A first status message is sent to the touchless payment device indicating that the customer has initiated a payment for the transaction. The mobile device and a payment service are interacted with to process the payment on behalf of the customer. Second status messages are provided to the touchless payment device in real time; the second status messages representing changes in the payment statuses for the payment based on the interaction with the mobile device and the payment service.

DETAILED DESCRIPTION

Figure 1A:
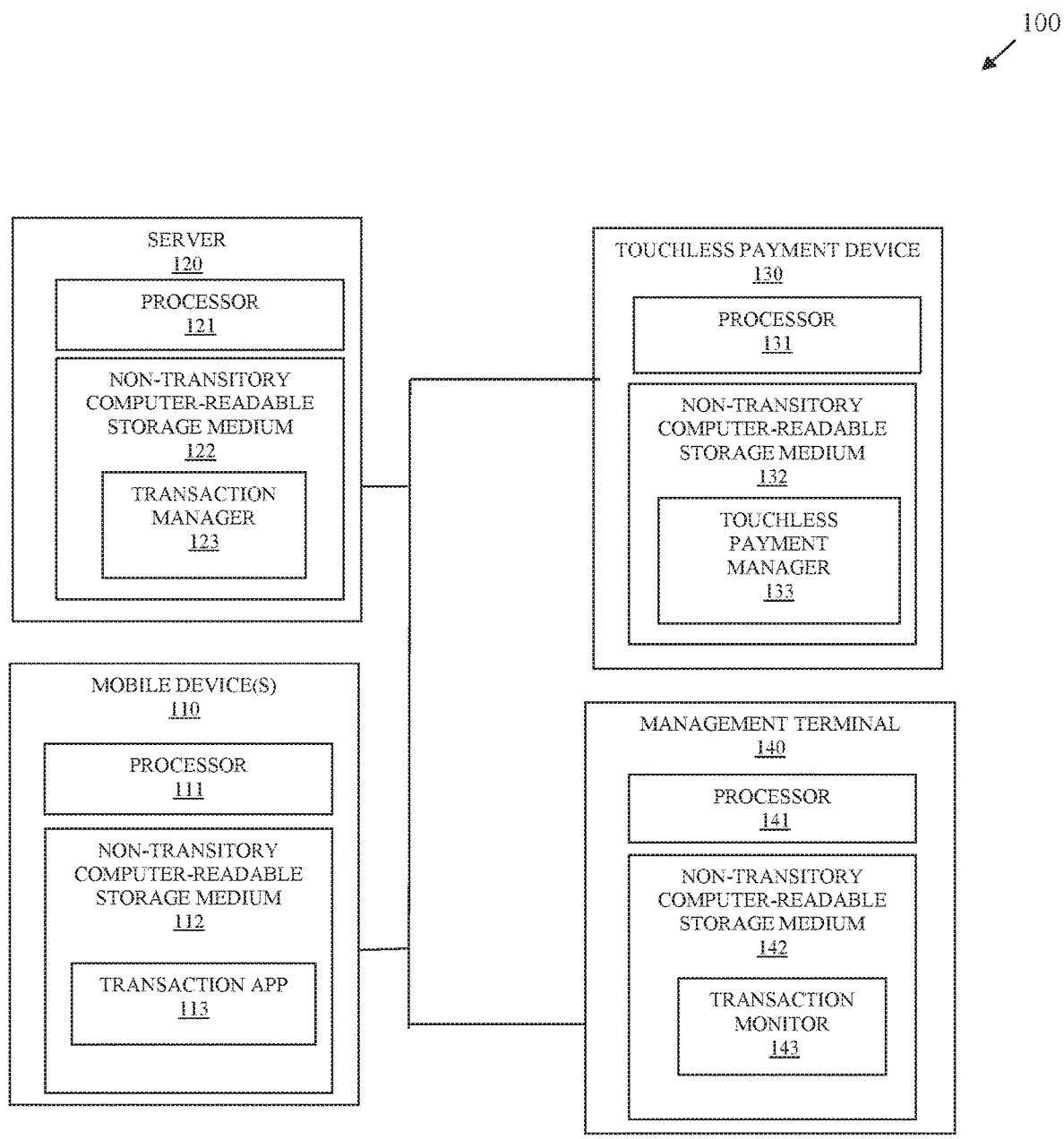
FIG. 1A is a diagram of a system for touchless payment processing, according to an example embodiment.

FIG. 1 is a diagram of a system 100 for touchless payment processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of touchless payment processing, presented herein and below.

System 100 permits touchless payments (frictionless payments) while maintaining security, monitoring touchless processed payments, and providing visual and/or audio payment processing progress alerts/notifications on a touchless payment device; the details of which are discussed herein and below.

The system 100 includes one or more customer-operated mobile devices 110, a server 120, a novel touchless payment device 130, and, a management terminal 140.

Each mobile device 110 comprises a processor 111 and a non-transitory computer-readable storage medium 112 comprising executable instructions, which are described below as transaction application (app) 113.

Server 120 comprises a processor 121 and a non-transitory computer-readable storage medium 122 comprising executable instructions, which are described below as transaction manager 123.

Touchless payment device 130 (may also be referred to as "touchless payment status device" herein and below) comprises a processor 131 and a non-transitory computer-readable storage medium 132 comprising executable instructions, which are described below as touchless payment manager 133.

Management terminal 140 comprises a processor 141 and a non-transitory computer-readable storage medium 142 comprising executable instructions, which are described below as transaction monitor 143.

The corresponding executable instructions when executed by the corresponding processor from the corresponding non-transitory computer-readable storage medium cause the corresponding processor to perform the processing discussed herein below on the corresponding device.

Initially, transaction manager 123 registers a touchless payment device 130 for performing touchless payment transaction verification. Touchless payment manager 133 sends a touchless payment device identifier (Internet Protocol (IP) address, Media Access Control (MAC address, etc.) to transaction manager 123. Transaction manager 123 then encodes or links the touchless payment device identifier to virtual carts via a code generated that optionally includes that identifier and an identifier for transaction manager 123 (IP address, etc.). The generated code can be a bar code, a Quick Response (OR) code, or a string. Moreover, the code can be randomly generated.

Touchless payment manager 133 then continuously displays the code on a display of touchless payment device 130 waiting for subsequent network communication from transaction manager 123.

Before, during, or after the displaying of the code by touchless payment manager 133, a customer uses their mobile device 110 to access transaction app 113 and perform self-scanning of items. The items being purchased and the item details along with prices for each item are noted in a server-maintained shopping cart (virtual cart) by transaction manager 123. The virtual cart is identified by customer identifier or customer mobile device identifier and by a transaction identifier associated with the transaction that corresponds to the virtual cart.

When the customer indicates that the customer is ready for payment within app 113, a selection for payment is made within a user-facing interface of app 113. The user-facing interface of app 113 then instructs the customer to scan/enter/obtain a presented code on the display of device 130. The obtained code is sent from app 113 to transaction manager 123, which associates app 113, virtual cart (transaction) of the customer, and touchless payment device 130 based on the information associated with the code and a mobile device identifier/customer identifier associated with device 110/the customer.

At this point, the customer uses the user-facing interface of app 113 to interact with transaction manager 123 and/or a payment service to ensure that payment for the transaction (virtual cart items) are properly paid for by the customer. The customer can use any payment service or payment method supported by app 113 and transaction manager 123, such as credit card, debit card, bank account, and/or digital wallet.

Transaction manager 123 reports the status of payment processing in real-time to touchless payment manager 133 and touchless payment manager displays corresponding payment statuses on a display of device 130 and/or illuminates a light and/or plays sounds/beeps/audio over a speaker that corresponds to the statuses of the payment processing as it progresses in real time. For example, a displayed color of the light may indicate the current status. Once the code is received by transaction manager 123 from app 113, transaction manager 123 may instruct touchless payment device 130 to display a green light (ready for payment status), as the payment moves to pending indicating that the payment service has been sent payment details associated with the payment the light changes to yellow (payment in-progress status), and when payment is confirmed the light changes to blue (payment confirmed status). Any combination of lights, sounds, colors, light effects may be used. The payment status provides a visual and/or audible indication of payment processing for a customer to staff in the vicinity of the exit of the store, such that the staff can readily determine when and if payment is received for the customer existing the store. If payment is rejected for any reason by the payment service used or not confirmed by transaction manager 123, touchless payment manager 133 may be instructed to illuminate a red light and/or sound a distinguishing audible sound indicated of a failed confirmation of payment.

In an embodiment, the payment status may concurrently be sent from transaction manager 123 to transaction monitor 143 of management terminal 140. This allows an attendant that monitors a bank of customer Self-Service Terminals (SSTs) to readily determine the payment status of customers exiting the store from those customers that are using the SSTs and readily determine the payment status of customers exiting the store utilizing the touchless payment processing discussed above.

In an embodiment, app 113 may obtain the code from device 130 via a Near Field Communication (NFC) tap or placement of device 110 in close proximity to device 130.

In an embodiment, app 113 may detect when device 110 is connected over a low-energy connection to a beacon associated with device 130 and transmit the code to app 113 without any scanning by device 110. Here, the connection may be a low-energy Bluetooth® connection.

In an embodiment, the customer operating device 110 may use a user-facing interface input field associated with app 113 to enter on a touchscreen of the customer's device 110 the code when the code is a presented string (numbers, characters, or a combination of both) on a display of device 130.

In an embodiment, device 110 does not require and never has any network connection to device 130.

In an embodiment, touchless payment device 130 lacks an Internet or Wide-Area Network (WAN) connection and only has a Local Area Network (LAN) connection to server 120. The LAN connection can be wired or wireless.

In an embodiment, once touchless payment device 130 is provided a network address link or an identifier to transaction manager 123, touchless payment manager 133 can generate and display codes without receiving the code from transaction manager 123. Here, each time a code is used as communicated by transaction manager 123 and/or based on a preset time limitation that expires, touchless payment manager 133 generates a new code and presented on the display of device 130.

In an embodiment, touchless payment device 130 is a modified version of an existing voice-enabled and network-enabled device, such as Google Home®, Amazon Echo®, etc.

In an embodiment, touchless payment device 130 is an Internet-Of-Things (IoT) device customized to perform the processing of touchless transaction manager 133.

In an embodiment, the lights that are colored and illuminated by manager 133 and/or the sounds that are played by manager 133 are integrated into device 130.

In an embodiment, the lights and/or speaker are controlled by a low-energy wireless connection between device 130 and the lights and/or speaker.

In an embodiment, the lights and/or speaker are controlled by transaction manager 123 over a wired, wireless, and/or combination of wired and wireless connections between manager 123 and lights and/or speakers.

A variety of additional processing may be coordinated by transaction manager 123 and touchless payment manager 133, such as when the virtual cart includes items that are restricted (require customer identification verification, such as for alcohol, tobacco, etc.) and items that require rescanning for whatever reason. The processing associated with such additional processing are discussed below with FIGS. 1B-1H.

Figure 1B:
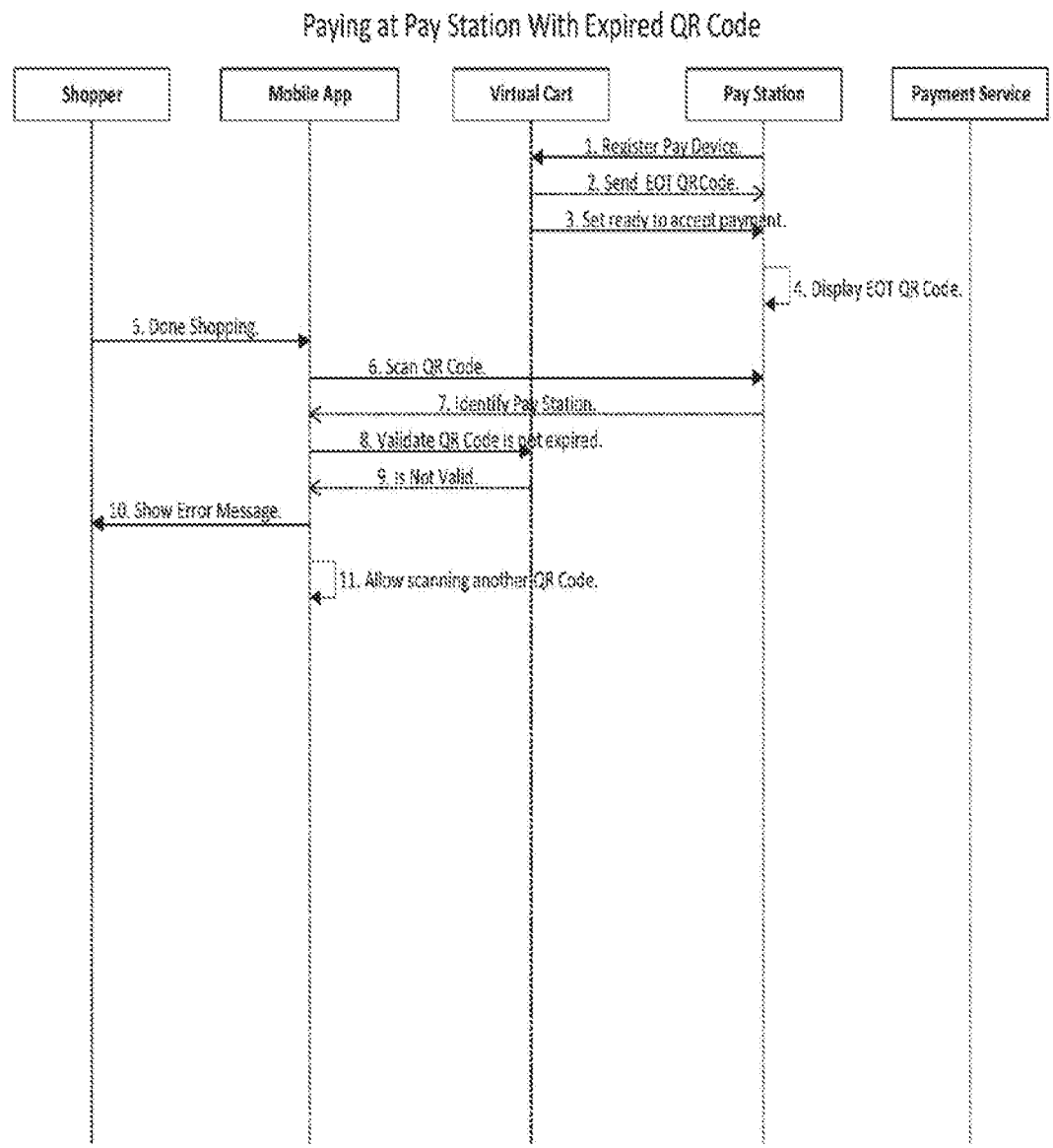
FIG. 1B is a diagram of device interaction for an initial failed attempt at touchless payment processing, according to an example embodiment.

FIG. 1B is a diagram of device interaction for an initial failed attempt at touchless payment processing, according to an example embodiment.

At 1, touchless payment manager 133, reports a device identifier for touchless payment device 130 (pay device and payment station in FIG. 1B) to the transaction manager 123 of server 120 for transactions (virtual cart in FIG. 1B).

At 2, transaction manager 123 end of trip (EOT) OR code or initial code to touchless payment manager 133 for use in displaying OR codes on a display of device 130 and/or generating subsequent OR codes displayed by manager 133 of a display of device 130.

At 3, transaction manager 123 sets the touchless payment manager 133 and device 130 (payment station) as configured, registered, and ready to process touchless payment transactions for virtual carts. That is, manager 123 knows where and how to contact device 130 and manager 133 knows where and how to contact server 120.

At 14, touchless payment manager 133 continuously displays a OR code on a display of device 130. Again, this code may be different from the End of Trip (EOT) OR code received from transaction manager 123 when device 130 was registered and configured for processing touchless payment transactions.

At 5, a customer indicates through the user-facing interface of app 113 that the customer is done shopping and ready to pay for the virtual cart (transaction items in the transaction).

At 6, the customer using app 113 scans the OR code presented on the display of device 130.

At 7, app 113 obtains the device identifier for device 130 from the scanned OR code.

At 8, app 113 interacts with transaction manager 123 for transaction manager 123 to verify that the code is still valid, e.g., has not been used before and/or based on evaluation of policy has not expired since it was first generated and displayed on the display of device 130 by touchless payment manager 133.

At 9, transaction manager 123 reports back to app 113 that the code has expired and is no longer valid for use with payment processing for the virtual cart (transaction). Transaction manager 123 may also instruction touchless payment manager 133 to display a new OR code assuming that manager 133 had not already switched the displayed code.

At 10, the user-facing interface of app 113 informs the customer that the code is invalid and to scan another code from the display of device 130.

At 11, the user facing interface of app 113 permits the customer to scan a new or different code from the display of device 130.

Figure 1C:
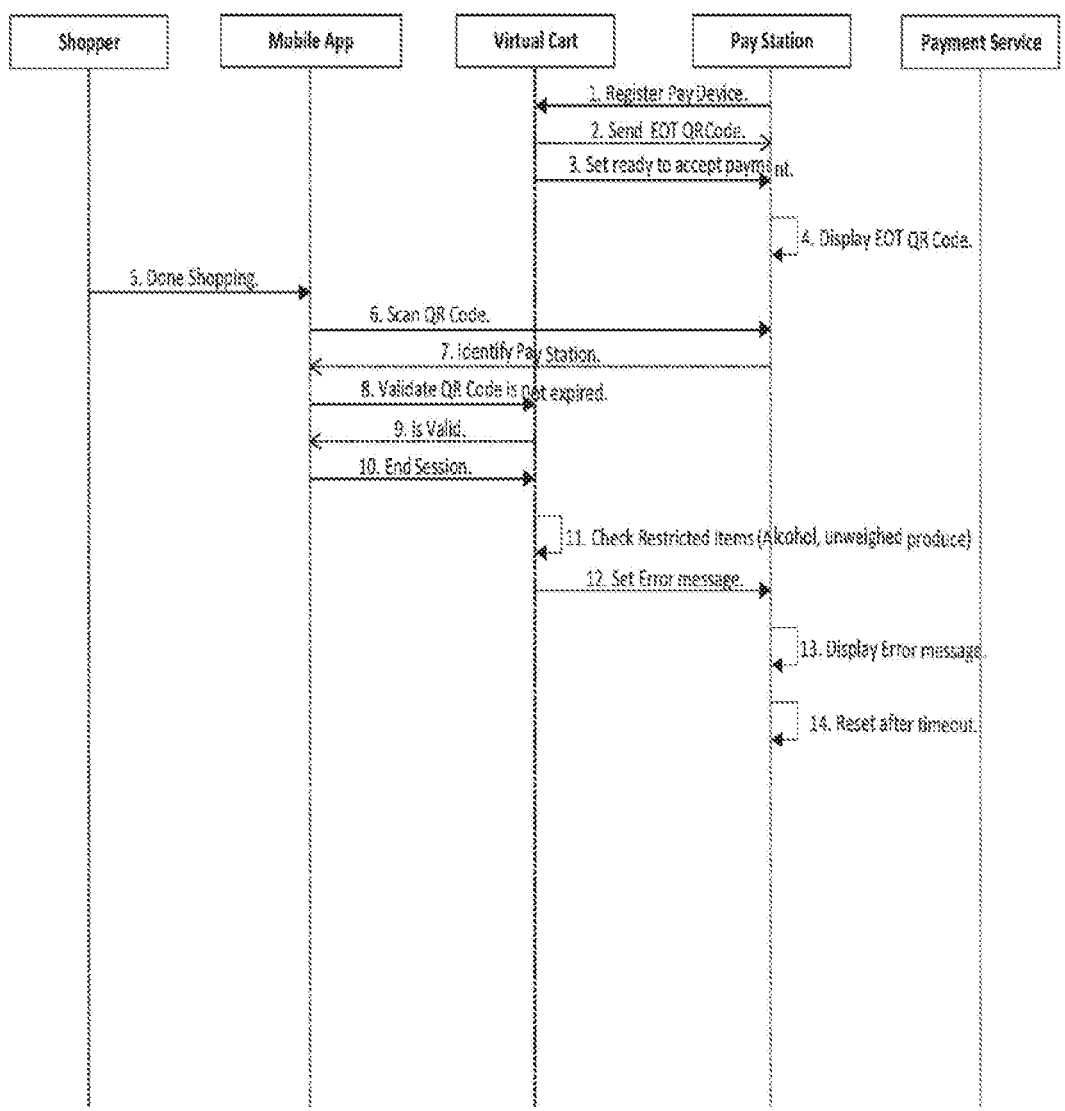
FIG. 1C is a diagram of device interaction for a touchless transaction that includes restricted items, according to an example embodiment.

FIG. 1C is a diagram of device interaction for a touchless transaction that includes restricted items, according to an example embodiment.

Processing steps 1-8 remain the same as FIG. 1B, but in FIG. 1C it is assumed that a validated OR code was sent by app 113 to transaction manager 123.

At 9, the OR code is validated as not having been used and as not having expired based on policy; a valid QR code.

At 10, interaction between device 110 and device 130 terminates upon validation of a valid OR code by transaction manager 123. It is noted that the interaction may just be visual through the capturing of the displayed OR code and there does not ever have to be any network connection between device 110 and device 130 (although in some embodiments there may have been an NFC communication or other low-energy Radio Frequency (RF) connection).

At 11, transaction manager 123 validated the items of the transaction looking for restricted items that appear in the list of items in the virtual cart (transaction).

At 12, restricted items are identified by transaction manager 123 and an error message corresponding to the restricted items are sent from transaction manager 123 to touchless payment manager 133. In an embodiment, an indication of the items that need customer verification and a transaction identifier are sent by transaction manager 123 to transaction monitor 143. This allows an attendant to come to the customer at the device 130 and manually verify the customer identification through a government-issued identification card. The transaction monitor 143 may then instruct transaction manager that the identification was successful such that payment processing may be continued for the transaction.

At 13, the error message is displayed on the display of device 130 by manager 133. The error message may be removed and a new OR code displayed after a configurable period of elapsed time or if transaction manager 123 receives the verification from monitor 143 before the elapsed time expires, such as when an attendant can visually determine that the customer is of proper age once receiving the verification.

At 14, touchless payment manager resets and removes the error message after a configured period of elapsed time and again displays a newly generated OR code.

Figure 1D:
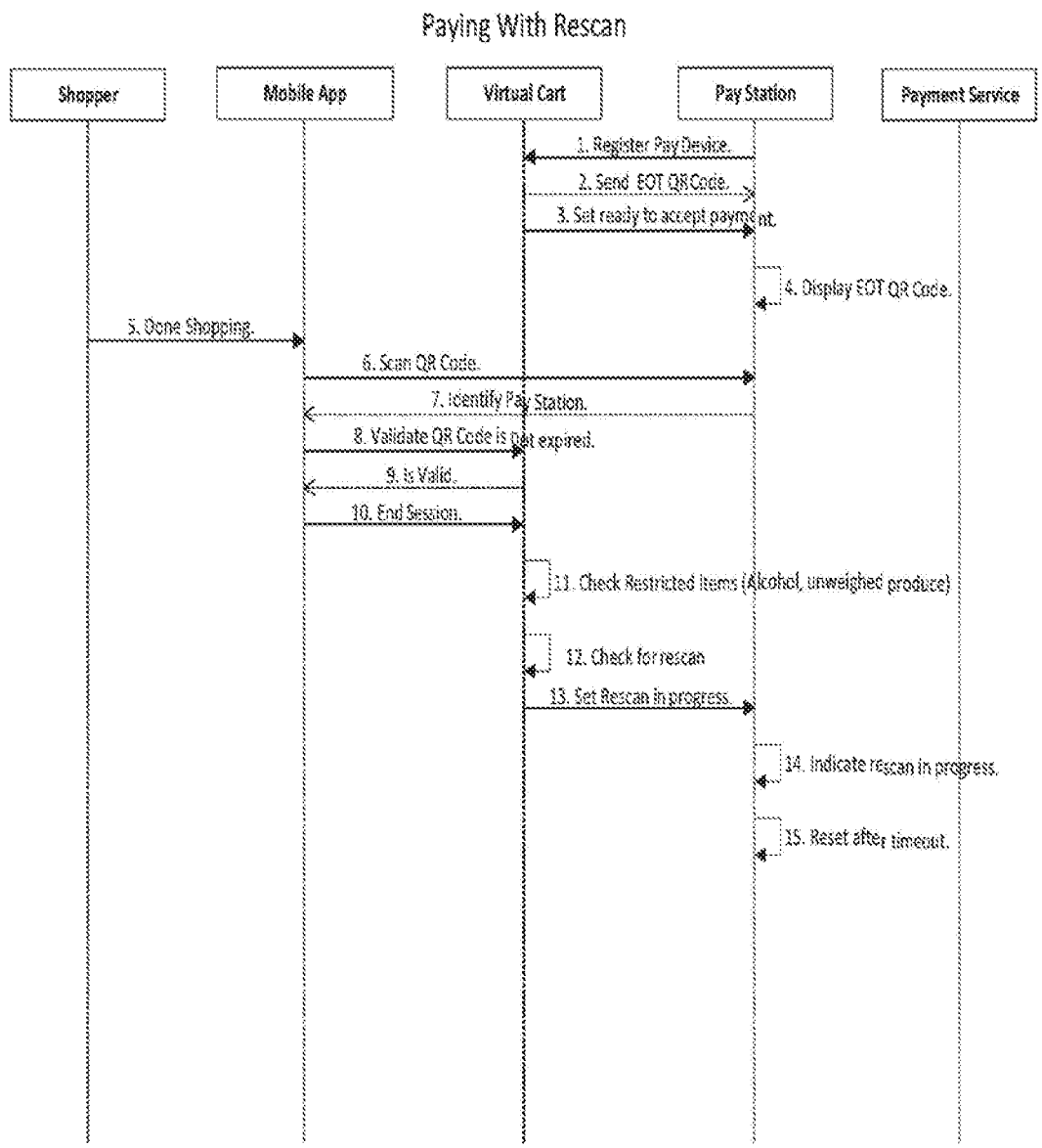
FIG. 1D is a diagram of device interaction for a touchless transaction that includes some items that require rescanning for the transaction, according to an example embodiment.

FIG. 1D is a diagram of device interaction for a touchless transaction that includes some items that require rescanning for the transaction, according to an example embodiment.

In FIG. 1D processing steps 1-11 are the same as what was presented above for FIG. 1C, but in FIG. 1D items in the virtual cart (transaction) are additionally checked for items that require rescanning. This can occur for a variety of reasons, such as transaction manager 123 being unable to ascertain a bar code on one of the items, an item that requires weighing and obtained a weight from a mobile scale in the store is not within a range that was considerable acceptable by manager 123, an item that requires weighing but was not weighed, etc.

At 12, transaction manager 123 checks the items in the virtual cart for any item that was flagged by manager 123 as requiring a rescan to obtain item information and price.

At 13, touchless payment manager 133 displays a message that rescanning of the flagged items is in progress. During this time, app 113 may be used to attempt to rescan the designated items with manager 123 or manager 123 may instruct an attendant from terminal 140 to rescan the questionable items or re-weigh them by notifying monitor 143 of the items and the location of the customer based on the touchless payment device's known and registered location.

It is noted that it may also be that the transaction manager 123 flagged the entire transaction for audit, which requires rescanning of all the items in the virtual cart. In such cases, an attendant from terminal 140 may instruct the customer to move to an attendant operated terminal (perhaps the management terminal 140) for the attendant to perform the rescanning of all the items for the audit.

At 14, touchless payment manager 133 displays a message that the rescanning is in progress once notified by transaction manager 123 that such is the case either through notification of scans by app 113 or notification of scans by monitor 143.

At 15, after a configured period of elapsed time, touchless payment manager 133 stops displaying the in-progress rescanning message on the display of device 130 and again displays a new OR code on the display for a next transaction assuming the payment for the transaction does not continue and is being handled by monitor 143.

Figure 1E:
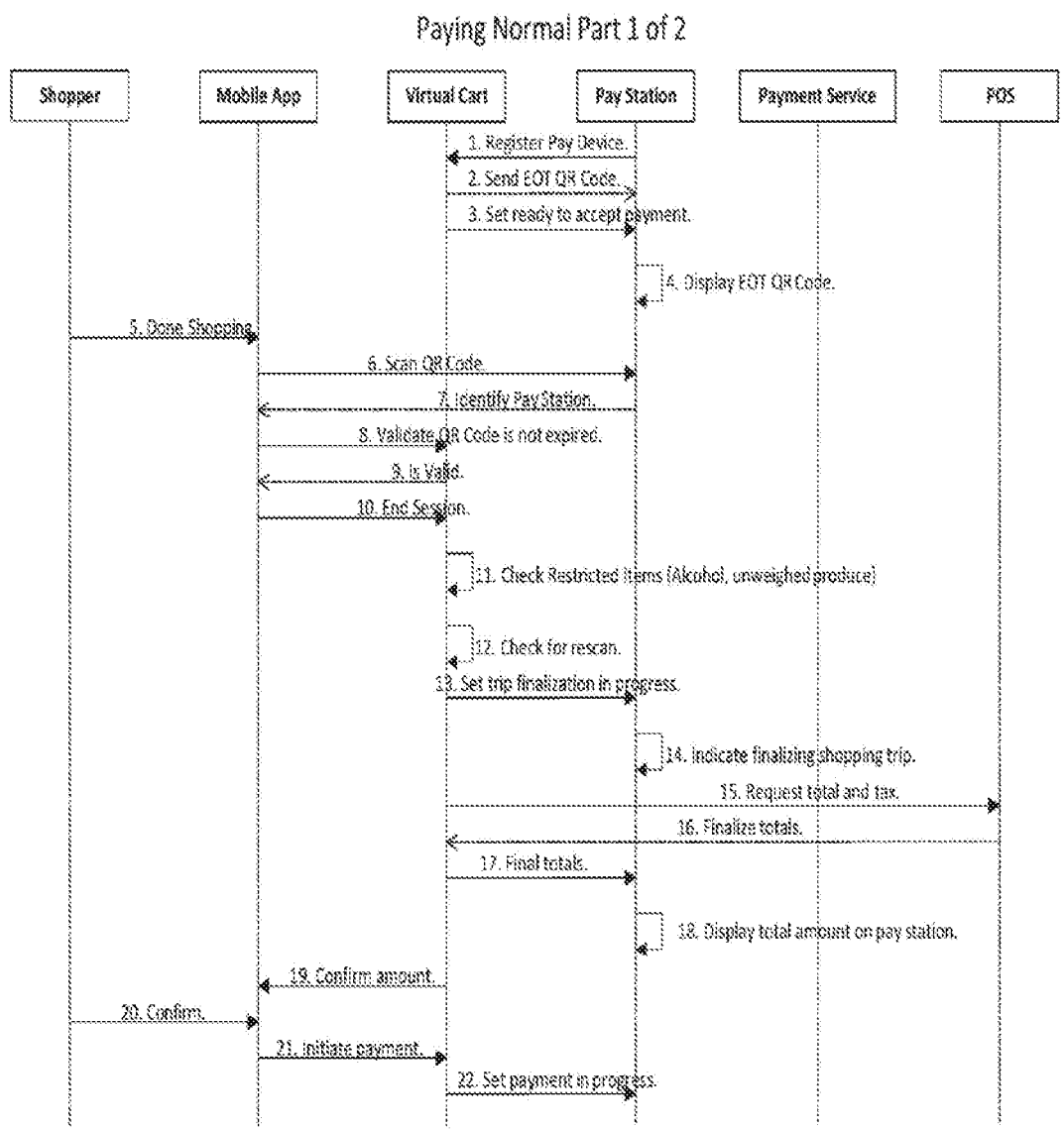
FIG. 1E is a diagram (part 1 of 2) of device interaction for a touchless transaction that may include restricted items and that may require rescanning of some of the items in the transaction, according to an example embodiment.

FIG. 1E is a diagram (part 1 of 2) of device interaction for a touchless transaction that may include restricted items and that may require rescanning of some of the items in the transaction, according to an example embodiment.

FIG. 1E the processing steps 1-12 are the same as was presented in FIG. 1D, but in FIG. 1E it is assumed that restricted items and rescan items are not needed or are handled properly before any time out message by monitor 143, such that transaction payment is processed for the transaction.

At 13, transaction manager 123 instructs touchless payment manager 133 to set the trip (transaction of the customer) to finalization. This causes manager 133 to display a message and/or illuminate adjacent lights/play sounds indicating that the transaction is being finalized for payment processing.

At 14, touchless payment manager 133 displays the appropriate progress message on the display and/or illuminates a specific color/plays a specific audible sound.

At 15, transaction manager 123 uses a user-provided payment method and contacts the appropriate payment service with the transaction details and a requested total with the appropriate tax calculated is requested of the payment service. This is done as soon as the finalization details are provided by the customer through the user-facing interface of app 113.

At 16, the payment service provides a confirmation back to transaction manager 123 of total with tax.

At 17, transaction manager 123 indicates to touchless payment manager 133 to change the displayed message on the display to present the finalized total for the transaction to the customer; also, colors of any illuminated lights are changed, and/or sounds of any played audio over speakers are changed in order to provide the payment status to the customer from the display of device 130 and provide the payment status visually and/or audibly to any proximate located attendants to device 130, such as an attendant of management terminal 140.

At 18, touchless payment manager 133 display the finalized totals on the display of device 130 and shows the current payment status as being successfully sent to payment service via the display, lights, and/or speakers.

At 19, transaction manager 123 sends a confirmation of the finalized total amount to app 113.

At 20, app 113 presents the finalized total to the customer through the user-facing interface of app 113 and requests a confirmation from the customer.

At 21, app 113 sends a confirmation received from the customer for the finalized total to transaction manager 123.

At 22, transaction manager 123 sends a message to touchless payment manager 133 to display on the display that the payment is now in progress and to change any illuminated light color and/or play any specialized audio to reflect the payment in-progress status for the transaction.

Figure 1F:
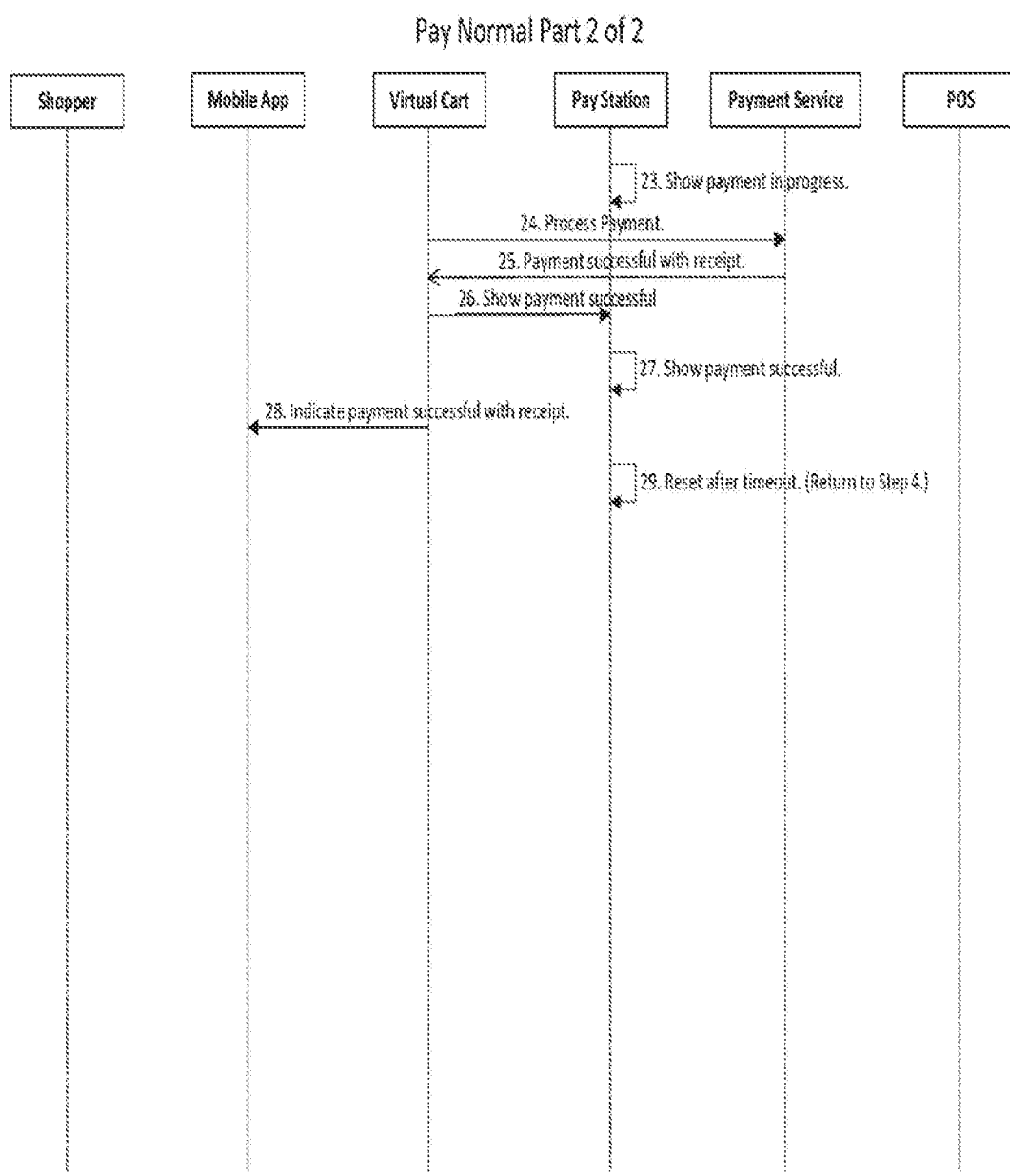
FIG. 1F is a diagram (part 2 of 2) of device interaction for a touchless transaction that may include restricted items and that may require rescanning of some of the items in the transaction, according to an example embodiment.

FIG. 1F continues the processing of FIG. 1E as part two.

FIG. 1F is a diagram (part 2 of 2) of device interaction for a touchless transaction that may include restricted items and that may require rescanning of some of the items in the transaction, according to an example embodiment.

At 23, touchless payment manager 133 presents the payment in-progress message on the display of device 130 and illuminates the lights and/or plays a corresponding audio sound that reflects the payment in-progress status.

At 24, transaction manager 123 sends the confirmed transaction details and payment details to the corresponding payment service selected or configured as a default payment method in a profile maintained by server 120 for the customer.

At 25, the payment service sends a successful payment completed message and transaction receipt back to transaction manager 123.

At 26, transaction manager 123 sends a payment was successful message and/or transaction receipt to touchless payment manager 133.

At 27, touchless payment manager 133 displays the successful payment message and/or transaction receipt on the display of device 130 and changes the corresponding light colors and/or plays a specialized audio to reflect that that payment was successfully received by the store for the virtual cart (transaction).

At 28, transaction manager 123 sends a successful payment message and the transaction receipt to app 113 for presentation and/or retrieval by the customer through the user-facing interface of app 113.

At 29, touchless payment manager 133 resets and removes any displayed messages on the display of device 130 and/or resets the light colors. Touchless payment manager 133 returns to processing step 4 with a new OR code for a next transaction displayed.

Figure 1G:
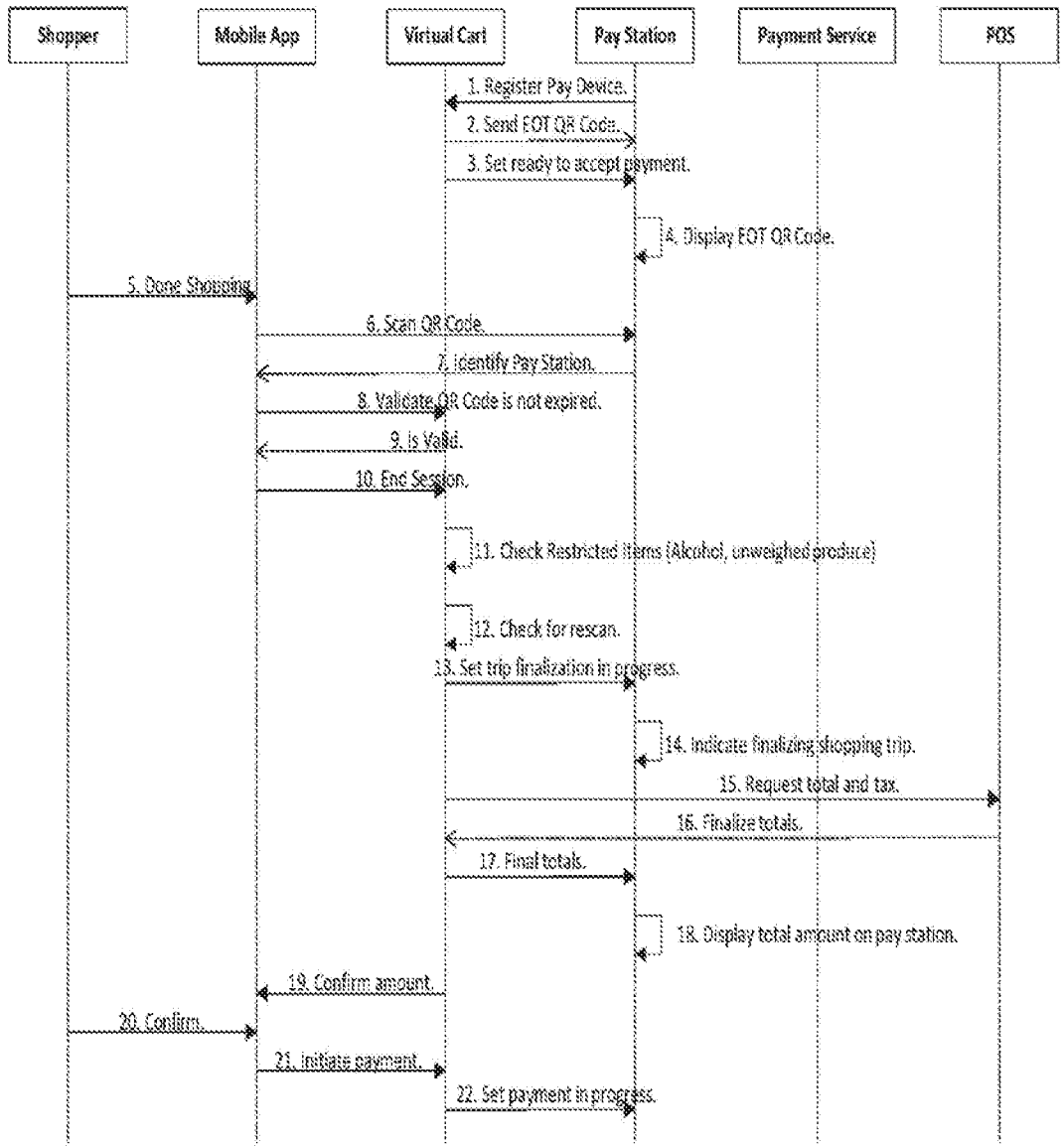
FIG. 1G is a diagram (part 1 of 2) of device interaction for an initial failed payment attempt at touchless payment processing, according to an example embodiment.

FIG. 1G is a diagram (part 1 of 2) of device interaction for an initial failed payment attempt at touchless payment processing, according to an example embodiment.

FIG. 1G includes all the same processing steps as 1-22 of FIG. 1E part 1 of 2. However, part 2 of 2 is changed in FIG. 1H and is different from part 2 of 2 shown in FIG. 1F. Correspondingly, only FIG. 1H needs discussion.

Figure 1H:
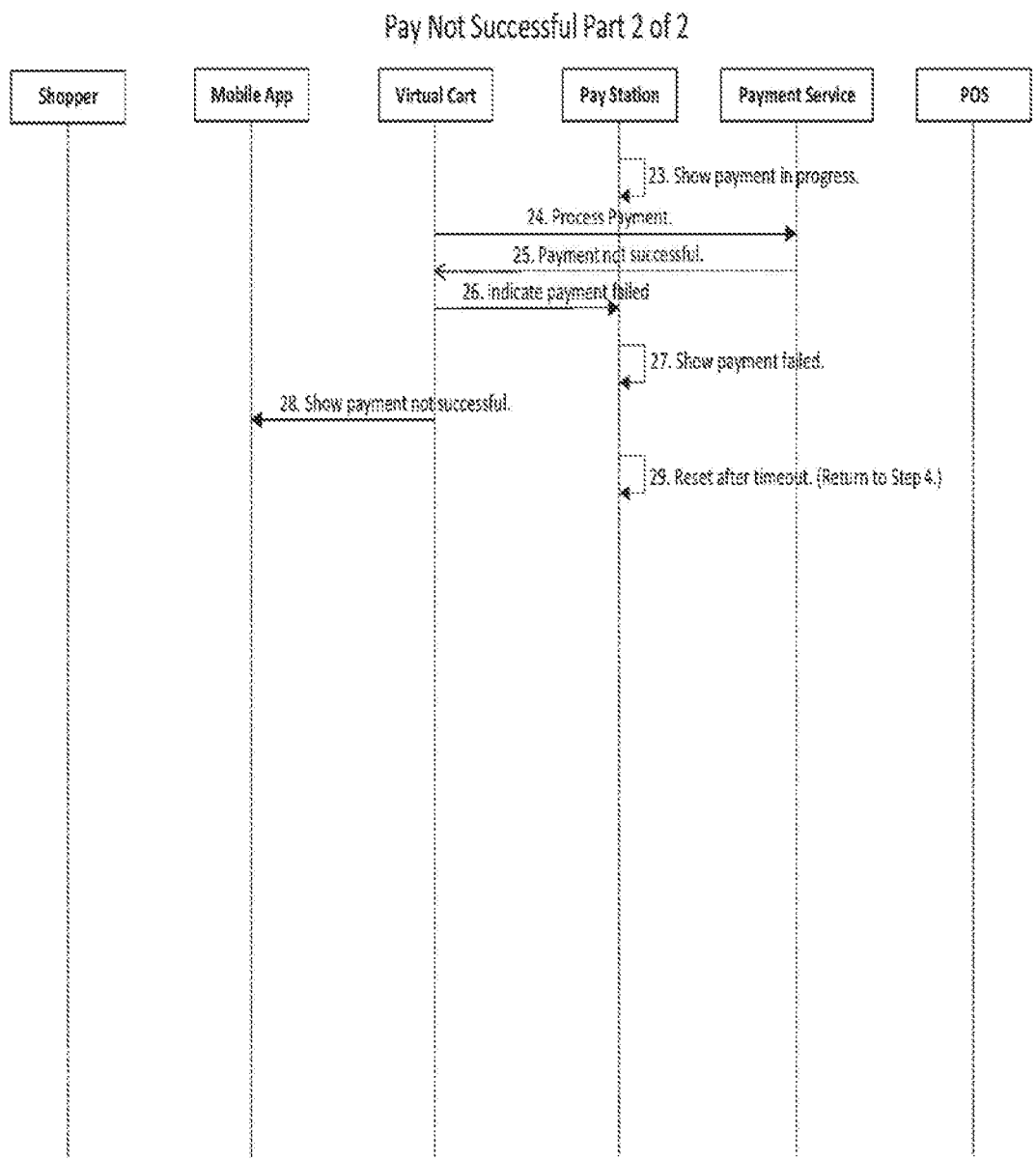
FIG. 1H is a diagram (part 2 of 2) of device interaction for an initial failed payment attempt at touchless payment processing, according to an example embodiment, according to an example embodiment.

FIG. 1H is a diagram (part 2 of 2) of device interaction for an initial failed payment attempt at touchless payment processing, according to an example embodiment, according to an example embodiment.

In FIG. 1H the payment method provided by the customer failed to process the payment successfully either because of it being incorrect or because it was denied for any other reason by the corresponding payment service associated with the payment method.

The processing at 23 and 24 of FIG. 1H is the same as was discussed above for FIG. 1F.

At 25, the payment service indicates to transaction manager 123 that the payment method for the transaction was not successfully processed by the payment service.

At 26, transaction manager 123 sends a payment failed message to touchless payment manager 133.

At 27, touchless payment manager 133 displays a message on the display of device 130 indicating the payment failed and changes the corresponding lights to a color reflecting a failed payment and/or plays a specialized audio indicative of a failed payment so as to alert store staff in the vicinity of the store exit.

At 28, transaction manager 123 instructions the app 113 to display a message that the payment failed to the customer in the user-facing interface of app 113.

At 29, touchless payment manager 133 removes the displayed message on the display and replaces it with a new OR code, lights and sounds are changed accordingly to reflect a reset back to processing step 4. This can occur after a preset elapsed period of time.

The customer may then utilize the user-facing interface of app 113 to provide a different payment method and rescan the new OR code presented by touchless payment manager 133 to retry with the new payment method.

Figure 2:
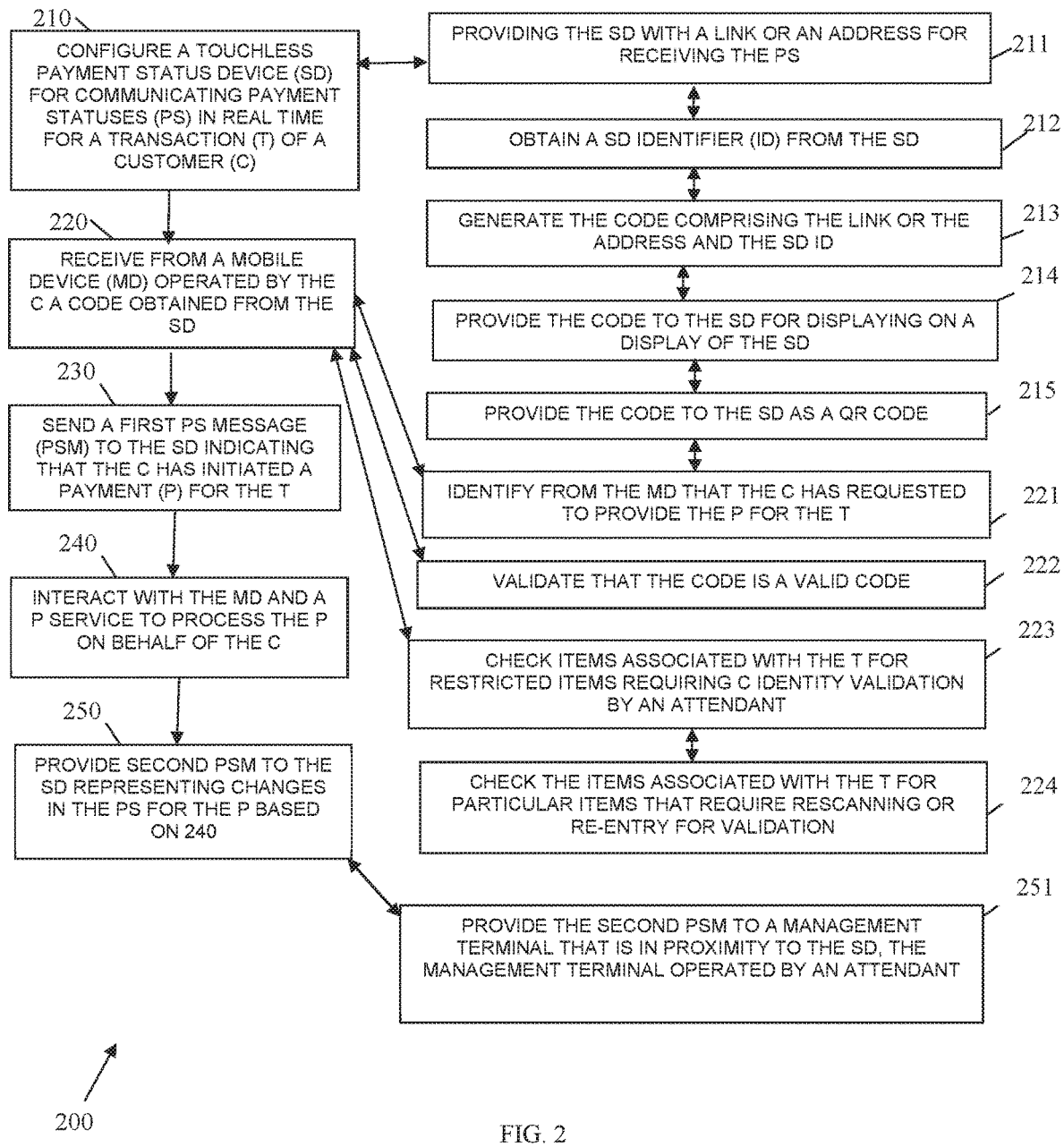
FIG. 2 is a diagram of a method for touchless payment processing, according to an example embodiment.
Figure 3:
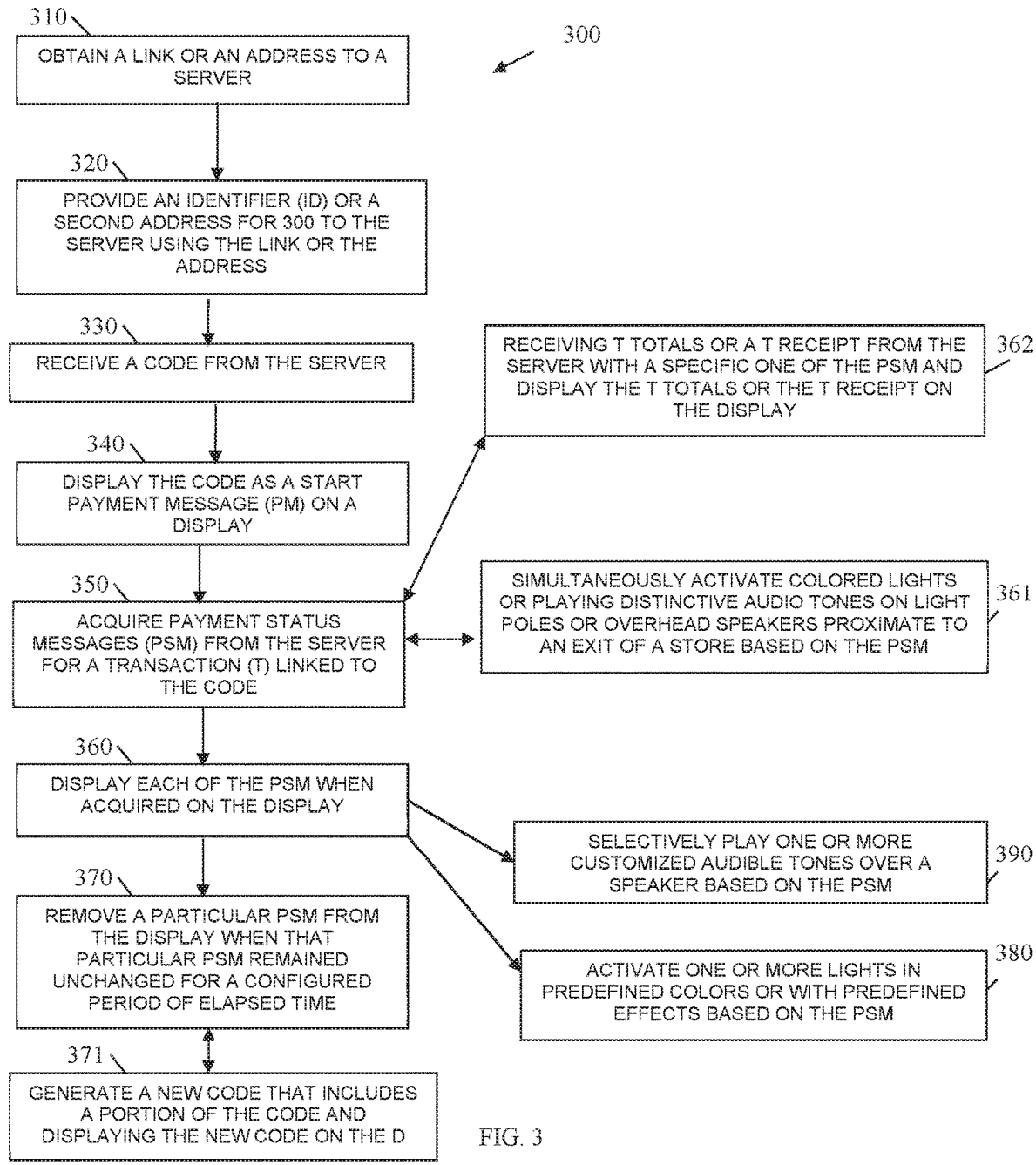
FIG. 3 is a diagram of another method for touchless payment processing, according to an example embodiment.

The above-noted embodiments and other embodiments are now discussed with FIGS. 2-3.

FIG. 2 is a diagram of a method 200 for touchless payment processing, according to an example embodiment. The software modules) that implements the method 200 is referred to as a "network-based transaction manager." The network-based transaction manager is implemented as executable instructions programmed and residing within memory and/or a non-transitory computer-readable (processor-readable) storage medium and executed by one or more processors of a cloud/server. The processor(s) of the device that executes the network-based transaction manager are specifically configured and programmed to process the network-based transaction manager. The network-based transaction manager has access to one or more network connections during its processing. The network connections can be wired, wireless, or a combination of wired and wireless.

In an embodiment, the network-based transaction manager executes on server 120. In an embodiment, the server 120 is one of multiple servers that logically cooperate as a cloud processing environment (cloud).

In an embodiment, the network-based transaction manager is transaction manager 123.

At 210, the network-based transaction manager configures a touchless payment status device for communicating payment statuses in real time for a transaction of a customer.

In an embodiment at 211, the network-based transaction manager provides the touchless payment device with a link or an address for receiving the payment statuses.

In an embodiment of 211 and at 212, the network-based transaction manager obtains a touchless payment device identifier from the touchless payment device from the touchless payment device.

In an embodiment of 212 and at 213, the network-based transaction manager generates a code comprising the link or the address and the touchless payment device identifier.

In an embodiment of 213 and at 214, the network-based transaction manager provides the code to the touchless payment device for displaying on a display of the touchless payment device.

In an embodiment of 214 and at 215, the network-based transaction manager provides the code to the touchless payment device as a OR code.

At 220, the network-based transaction manager receives from a mobile device operated by the customer a code obtained from the touchless payment device.

In an embodiment, at 221, the network-based transaction manager identifies from the mobile device that the customer has requested to provide the payment for the transaction.

In an embodiment, at 222, the network-based transaction manager validates that the code is a valid code.

In an embodiment, at 223, the network-based transaction manager checks items associated with the transaction for restricted items requiring customer identity validation by an attendant.

In an embodiment of 223 and at 224, the network-based transaction manager checks the items associated with the transaction for particular items that require rescanning or re-entry for validation.

At 230, the network-based transaction manager sends a first status message to the touchless payment device indicating that the customer has initiated a payment for the transaction.

At 240, the network-based transaction manager interacts with the mobile device and a payment service to process the payment on behalf of the customer.

At 250, the network-based transaction manager provides second status messages to the touchless payment device representing changes in the payment statuses for the payment based on the interacting.

In an embodiment, at 251, the network-based transaction manager provides the second message to a management terminal that is in proximity to the touchless payment device, wherein the management terminal operated by an attendant.

FIG. 3 is a diagram of another method 300 for touchless payment processing, according to an example embodiment. The software module(s) that implements the method 300 is referred to as a "touchless payment manager." The touchless payment manager is implemented as executable instructions programmed and residing within memory and/or a non-transitory computer-readable (processor-readable) storage medium and executed by one or more processors of a specialized device. The processors that execute the touchless payment manager are specifically configured and programmed to process the touchless payment manager. The touchless payment manager has access to one or more network connections during its processing. The network connections can be wired, wireless, or a combination of wired and wireless.

In an embodiment, the touchless payment manager executes on touchless payment device 130. In an embodiment, the touchless payment device 130 is a modified voice and networked enabled device. In an embodiment, device 130 is a specialized IoT device.

In an embodiment, the touchless payment manager is touchless payment manager 133.

The touchless payment manager interacts over a network connection with transaction manager 123 and/or method 200. The network connection can be wired, wireless, or a combination of wired and wireless.

At 310, the touchless payment manager obtains a link or an address to a server.

At 320, the touchless payment manager provides an identifier or a second address for the method to the server using the link or the address.

At 330, the touchless payment manager receives a code from the server.

At 340, the touchless payment manager displays the code as a start payment message on a display.

At 350, the touchless payment manager acquires payment status messages from the server for a transaction linked to the code.

At 360, the touchless payment manager displays each of the payment status messages when acquired on the display.

In an embodiment, at 361, the touchless payment manager simultaneously activates colored lights or plays distinctive audio tones on light poles or overhead speakers proximate to an exit of a store based on the payment status messages.

In an embodiment, at 362, the touchless payment manager receives transaction totals or a transaction receipt from the server with a specific one of the payment status messages and displaying the transaction totals or the transaction receipt on the display.

In an embodiment, at 370, the touchless payment manager removes a particular payment status messages from the display when that particular status message remained unchanged for a configured period of elapsed time.

In an embodiment of 370 and at 371, the touchless payment manager generates a new code that includes a portion of the code and displaying the new code on the display.

In an embodiment, at 380, the touchless payment manager activates one or more lights in predefined colors or with predefined effects based on the payment status messages.

In an embodiment, at 390, the touchless payment manager selectively plays one or more customized audible tones over a speaker based on the payment status messages.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a touchless payment status device from a non-transitory computer-readable storage medium causing the processor to perform operations comprising:
obtaining a link to a server;
sending an Internet Protocol (IP) address for the touchless payment status device using the link;
receiving an initial code from the server based on the sending;
generating a generated code based on the initial code, wherein the generated code comprises a portion of the initial code, the link and the IP address;
updating the generated code after a preset time expires or after receiving notification from the server that the generated code has been used;
continuously displaying the generated code or the updated generated code as a start payment message on a display;
acquiring, in real time, payment status messages from the server for a transaction linked to the generated code or the updated generated code by the server as a frictionless payment for the transaction that is being collected and processed by the server through interaction of the server with a customer via a customer operated mobile device, wherein the customer operated mobile device is different from the touchless payment status device;
displaying, in real time, a first payment status message indicating the customer has initiated the frictionless payment for the transaction, wherein the frictionless payment was initiated by the customer operated mobile device obtaining the generated code or the updated generated code from the display and sending the generated code or the updated generated code to the server that maintains a virtual cart for the transaction of the customer; and
displaying, in real time, a second payment status message representing changes in a payment status of the transaction based on an interaction between the customer operated mobile device and the server.

2. The method of claim 1, wherein the executable instructions further cause the processor to perform additional operations, comprising removing a particular payment status messages from the display when that particular payment status message remained unchanged for a configured period of elapsed time.

3. The method of claim 2, wherein removing further includes generating a new code that includes the portion of the initial code and displaying the new code on the display.

4. The method of claim 1, wherein the executable instructions further cause the processor to perform additional operations, comprising activating one or more lights in predefined colors or with predefined effects based on the payment status messages.

5. The method of claim 1, wherein the executable instructions further cause the processor to perform additional operations, comprising selectively playing one or more customized audible tones over a speaker based on the payment status messages.

6. The method of claim 1, wherein displaying the second payment status message further includes simultaneously activating colored lights or playing distinctive audio tones on light poles or overhead speakers proximate to an exit of a store based on the second payment status message.

7. The method of claim 1, wherein displaying the second payment status message further includes receiving transaction totals or a transaction receipt from the server and displaying the transaction totals or the transaction receipt on the display.

8. A touchless payment status device, comprising:
a processor;
a non-transitory computer-readable storage medium having executable instructions;
the executable instructions when executed by the processor from the non-transitory computer-readable storage medium cause the processor to perform processing comprising:
obtaining a link to a server;
sending an Internet Protocol (IP) address for the touchless payment status device to the server using the link;
receiving an initial code from the server;
generating a generated code based on the initial code, wherein the generated code comprises a portion of the initial code, the link and the IP address;
updating the generated code after a preset time expires or after receiving notification from the server that the generated code has been used;
continuously displaying the generated code or the updated generated code as a start payment message on a display;
acquiring, in real time, payment status messages from the server for a transaction linked to the generated code or the updated generated code as a frictionless payment for the transaction that is being collected and processed by the server through interaction with a customer via a customer operated mobile device, wherein the customer operated mobile device is different from the touchless payment status device;

displaying, in real time, a first payment status message indicating the customer has initiated the frictionless payment for the transaction, wherein the frictionless payment was initiated by the customer operated mobile device obtaining the generated code or the updated generated code from the display and sending the generated code or the updated generated code to the server that maintains a virtual cart for the transaction of the customer; and displaying, in real time, a second payment status message representing changes in a payment status of the transaction based on an interaction between the customer operated mobile device and the server.

9. The touchless payment status device of claim 8, wherein the executable instructions when executed by the processor from the non-transitory computer-readable storage medium cause the processor to perform additional processing comprising:

simultaneously activating colored lights or playing distinctive audio tones on light poles or overhead speakers proximate to an exit of a store based on the first or second payment status messages.

* * * * *